(No Model.)
W. KLINKER.
HORSE HAY RAKE.
No. 368,953.   Patented Aug. 30, 1887.
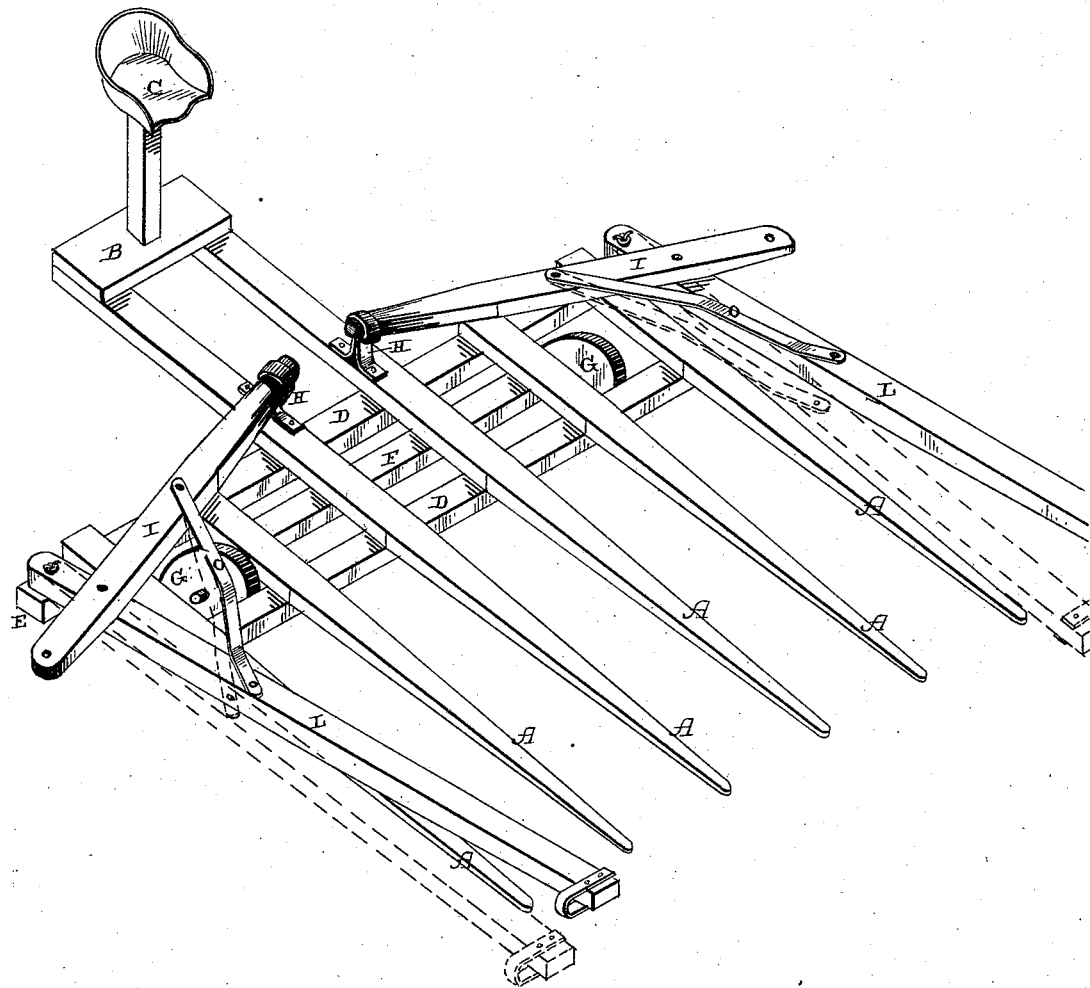

UNITED STATES PATENT OFFICE.

WESLEY KLINKER, OF UNION MILLS, IOWA.

HORSE HAY-RAKE.

SPECIFICATION forming part of Letters Patent No. 368,953, dated August 30, 1887.

Application filed October 26, 1886. Serial No. 217,263. (No model.)

*To all whom it may concern:*

Be it known that I, WESLEY KLINKER, of Union Mills, in the county of Mahaska and State of Iowa, have invented certain new and useful Improvements in Horse Hay-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in horse hay-rakes; and it consists in the combination of the teeth, the axle secured to their under side, the wheels by which the rear end of the rake is supported, the cross-ties by means of which the ends of the teeth are connected together, suitable castings or sockets, which are secured upon the top of the rake near its center, the draft-rods, which have their inner ends held in these castings or sockets, and which project outward beyond the sides of the teeth, the rods to which the horses are fastened, and which are pivoted upon the rear cross-bar, and the braces, which unite the two sets of rods together, and which serve as stops to prevent the hay from being forced back over the rear end of the rod, all of which will be more fully described hereinafter.

The accompanying drawing represents a perspective of a rake to which my invention is applied.

A represents the rake-teeth, the two central ones of which are made to extend backward sufficiently far to form a support, B, for the driver's seat C, in the usual manner. These teeth are secured together by the two cross-bars D, the rear one of which is made long enough to have its two ends, E, project beyond the sides of the teeth, as shown. To the under side of the teeth, between the two cross-ties, is secured the axle F, upon which the wheels G are placed. These wheels support the rear end of the rake and keep it raised above the ground, as shown.

Secured to the two central teeth at any suitable point are the castings or bearings H, in which the inner ends of the draft-rods I are loosely held. The upper portions of these castings form loops or rings through which the round inner ends of the draft-rods pass, and in which the ends of the rods have a slight turning movement. The outer ends of these draft-rods project sufficiently far beyond the outer edges of the teeth to allow the draft animals to be secured thereto. Pivoted upon the extended ends E of the rear cross-bar are the guiding-rods L, to which the front end of the horses' heads are fastened, so as to cause them to always pull in a line with the rake-teeth. The draft-rods are rigidly secured to the guiding-rods, and the two sets of rods are then braced together by means of the braces O. The inner ends of the draft-rods being loosely held in the castings, and the rear ends of the guiding-rods being loosely connected to the cross-bar, the guiding-rods can be raised and lowered freely at their outer ends, as shown by dotted lines, and in being moved vertically raise the braces and the draft-rods so that they will catch behind the hay which is being raked, and thus prevent the hay from being forced backward over the rear end of the teeth by the forward movement of the rake. As long as the horses are fastened to the guiding-bars, they are held in a raised position, thus bringing the draft-rods and braces into play; but as soon as the horses are detached the rods drop downward into the position shown in dotted lines.

While the parts are held by the horses in the position shown by solid lines, the draft-bars I and the braces O form stops to prevent the hay from being pushed back over the rear end of the rake, as would be the case were these parts not used and made vertically adjustable. The first hay raked up is pushed backward by the hay subsequently raked until it strikes against the draft-rods, where it stops. The braces serve specially to prevent the hay from being pushed outward over the rear corners of the rake.

Having thus described my invention, I claim—

1. The combination of the rake-teeth, the axle placed under their rear ends and provided with the wheels G, the cross-bars D, extending across the rear ends of the teeth, the castings H, placed upon the teeth, the draft-rods, which have their inner ends loosely held in the castings, the rods L, loosely fastened at their rear ends upon the extended ends of one of the cross-bars D, and rigidly fastened to the draft-rods near their outer ends, substantially as shown.

2. The combination of the rake-teeth, the axle F, wheels G, and cross-bars D, one of which has the extended ends E, with the castings H, secured to the teeth, the draft-rods I, which have their inner ends loosely held in the castings, so as to have a turning movement therein, the rods L, loosely fastened upon the extended ends and rigidly secured to the draft-rods, and the braces O, which serve as stops for the hay, substantially as set forth.

In testimony whereof I affix my signature in presence of two witnesses.

WESLEY KLINKER.

Witnesses:
STANTON KLINKER,
J. W. FRY.